United States Patent
Achatz et al.

(10) Patent No.: US 10,697,032 B2
(45) Date of Patent: Jun. 30, 2020

(54) METHOD FOR GENERATING SYNTHESIS GAS IN CONJUNCTION WITH A SMELTING WORKS

(71) Applicant: ThyssenKrupp AG, Essen (DE)

(72) Inventors: Reinhold Achatz, Essen (DE); Jens Wagner, Frankfurt a.M. (DE); Markus Oles, Hattingen (DE); Peter Schmöle, Dortmund (DE); Ralph Kleinschmidt, Mülheim a.d.Ruhr (DE); Denis Krotov, Dortmund (DE); Olaf von Morstein, Essen (DE); Karsten Büker, Dortmund (DE)

(73) Assignee: THYSSENKRUPP AG, Essen (DE)

( * ) Notice: Subject to any disclaimer, the term of this patent is extended or adjusted under 35 U.S.C. 154(b) by 0 days.

(21) Appl. No.: 15/103,143

(22) PCT Filed: Dec. 11, 2014

(86) PCT No.: PCT/EP2014/003317
§ 371 (c)(1),
(2) Date: Jun. 9, 2016

(87) PCT Pub. No.: WO2015/086151
PCT Pub. Date: Jun. 18, 2015

(65) Prior Publication Data
US 2016/0348196 A1  Dec. 1, 2016

(30) Foreign Application Priority Data
Dec. 12, 2013 (DE) .................. 10 2013 113 933

(51) Int. Cl.
*C21B 7/00* (2006.01)
*C21B 5/06* (2006.01)
(Continued)

(52) U.S. Cl.
CPC .............. *C21B 7/002* (2013.01); *C01G 3/00* (2013.01); *C10B 27/00* (2013.01); *C10K 3/04* (2013.01);
(Continued)

(58) Field of Classification Search
CPC .. C21B 7/002; C21B 5/06; C21B 5/38; C21B 5/21; C01G 3/00; C10K 27/04;
(Continued)

(56) References Cited

U.S. PATENT DOCUMENTS 3,595,619 A * 7/1971 Slater et al. .............. C01B 3/16
  252/373
3,767,379 A * 10/1973 Marion .................... C01B 3/36
  75/464

(Continued)

FOREIGN PATENT DOCUMENTS

CN 1803746 A 7/2006
CN 101343580 A 1/2009
(Continued)

OTHER PUBLICATIONS

EP-0200880-A2 machine translation (Year: 1986).*
(Continued)

*Primary Examiner* — Tima M. McGuthry-Banks
(74) *Attorney, Agent, or Firm* — thyssenkrupp North America, LLC

(57) ABSTRACT

The invention relates to a method for producing syngas in combined operation with a metallurgical plant which comprises at least one blast furnace for producing crude iron, a converter steel mill and a coke-oven plant. Part of the blast-furnace top gas that is produced in the production of crude iron and/or part of the converter gas that occurs in the converter steel mill and/or part of the coke-oven gas that is produced in the coke-oven plant are mixed. By choosing the
(Continued)

gas streams that are brought together to form a mixed gas and/or by changing the mixing ratios of the gas streams that are brought together, at least two streams of useful gas are produced, differing with regard to their composition and respectively prepared to form streams of syngas.

12 Claims, 1 Drawing Sheet

(51) Int. Cl.
C21C 5/38 (2006.01)
C10K 3/04 (2006.01)
C10K 3/06 (2006.01)
C01G 3/00 (2006.01)
C21C 5/28 (2006.01)
C10B 27/00 (2006.01)

(52) U.S. Cl.
CPC ............ C10K 3/06 (2013.01); C21B 5/06 (2013.01); C21C 5/285 (2013.01); C21C 5/38 (2013.01); C01B 2203/025 (2013.01); C01B 2203/0216 (2013.01); C01B 2203/0283 (2013.01); C01B 2203/043 (2013.01); C01B 2203/06 (2013.01); C21B 2100/24 (2017.05); Y02E 60/366 (2013.01); Y02P 10/143 (2015.11); Y02P 10/283 (2015.11)

(58) Field of Classification Search
CPC .. C10K 27/06; C10K 3/04; C10K 3/06; C21C 5/285; C21C 5/38; C10B 27/00
See application file for complete search history.

(56) References Cited

U.S. PATENT DOCUMENTS

| | | | | |
|---|---|---|---|---|
| 5,454,853 | A * | 10/1995 | Edelson | C21C 5/52 75/10.34 |
| 2006/0027043 | A1 | 2/2006 | Zendejas-Martinez | |
| 2010/0294312 | A1* | 11/2010 | Richter | B01D 53/1487 134/19 |
| 2014/0343339 | A1* | 11/2014 | Schodel | C07C 41/01 585/639 |
| 2015/0299594 | A1* | 10/2015 | Hinnemann | C07C 41/09 585/322 |
| 2016/0348196 | A1 | 12/2016 | Achatz et al. | |

FOREIGN PATENT DOCUMENTS

| | | | |
|---|---|---|---|
| CN | 102211977 A | * | 10/2011 |
| CN | 103525965 | * | 1/2014 |
| DE | 3101067 | * | 7/1982 |
| DE | 102011077819 A1 | | 12/2012 |
| DE | 102011113547 A1 | | 3/2013 |
| DE | 102013113913 A1 | | 6/2015 |
| DE | 102013113921 A1 | | 6/2015 |
| DE | 102013113942 A1 | | 6/2015 |
| DE | 102013113950 A1 | | 6/2015 |
| DE | 102013113958 A1 | | 6/2015 |
| DE | 102013113980 A1 | | 6/2015 |
| EP | 0200880 A2 | * | 11/1986 ............... C01B 3/12 |
| EP | 200880 A2 | | 11/1986 |
| EP | 244551 A1 | | 3/1990 |
| EP | 2543743 A1 | | 1/2013 |
| EP | 2657215 A1 | | 10/2013 |
| FR | 2420568 A1 | | 10/1979 |
| JP | H02254115 | * | 1/1990 |
| JP | 2011225969 A | | 11/2011 |
| KR | 20130075031 A | * | 7/2013 |
| RU | 2353036 C1 | | 4/2009 |
| WO | 0005421 A1 | | 2/2000 |
| WO | 2010136313 A1 | | 12/2010 |
| WO | 2011018124 A1 | | 2/2011 |
| WO | 2015086148 A1 | | 6/2015 |
| WO | 2015086149 A1 | | 6/2015 |
| WO | 2015086150 A1 | | 6/2015 |
| WO | 2015086151 A1 | | 6/2015 |
| WO | 2015086152 A1 | | 6/2015 |
| WO | 2015086153 A1 | | 6/2015 |
| WO | 2015086154 A1 | | 6/2015 |

OTHER PUBLICATIONS

CN 103525965 machine translation (Year: 2014).*
JP H02254115 machine translation (Year: 1990).*
KR 20130075031 A machine translation (Year: 2013).*
CN 102211977 A machine translation (Year: 2011).*
DE 3101067 machine translation (Year: 1982).*
JP H02-254115 human translation (Year: 1990).*
ESPACNET family data for publications including US 2014343339 (Year: 2014).*
EP 0200880 A1 human translation (Year: 1986).*
Chinese Application No. 201480067680.7, Office Action dated Apr. 6, 2017, 21 pages.
PCT Application No. PCT/EP2014/03317, Written Opinion, dated Jun. 18, 2015, 10 pages.
PCT Application No. PCT/EP2014/03317, International Search Report, dated Jun. 18, 2015, 5 pages.
Canadian Application No. 2,930,463, Office Action dated Mar. 27, 2017, 6 pages.
EP 308037 A1 (using English translation of Abstract of corresponding published application DE 102013113933), published Jun. 18, 2015.
Russian Application No. 2016127975, Office action dated Dec. 19, 2017, 11 pages
Canadian Application No. 2,930,463, Office Action dated Oct. 18, 2017, 3 pages.

* cited by examiner

METHOD FOR GENERATING SYNTHESIS GAS IN CONJUNCTION WITH A SMELTING WORKS

CROSS-REFERENCE TO RELATED APPLICATIONS

This application is the national phase of, and claims priority to, International Patent Application No. PCT/EP2014/003317, filed Dec. 11, 2014, which designated the U.S. and which claims priority to German Patent Application Number DE 10 2013 113 933.7, filed Dec. 12, 2013. These applications are each incorporated by reference herein in their entireties.

BACKGROUND

1. Field of the Invention

The invention relates to a method for producing syngas in combined operation with a metallurgical plant which comprises at least one blast furnace for producing crude iron, a converter steel mill and a coke-oven plant.

2. Description of the Related Art

Crude iron is obtained in the blast furnace from iron ores, additives such as coke and other reducing agents such as coal, oil, gas, biomasses, recycled waste plastics or other substances containing carbon and/or hydrogen. CO, $CO_2$, hydrogen and water vapour inevitably occur as products of the reduction reactions. Apart from the aforementioned constituents, a blast-furnace top gas drawn off from the blast-furnace process often has a high content of nitrogen. The amount of gas and the composition of the blast-furnace top gas are dependent on the feedstock and the operating mode and are subject to fluctuations. Typically, however, blast-furnace top gas contains 35 to 60% by volume $N_2$, 20 to 30% by volume CO, 20 to 30% by volume $CO_2$ and 2 to 15% by volume $H_2$. Around 30 to 40% of the blast-furnace top gas produced in the production of the crude iron is generally used for heating up the hot air for the blast-furnace process in air heaters; the remaining amount of top gas may be used in other areas of the mill for heating purposes or for electricity generation.

In the converter steel mill, which is arranged downstream of the blast-furnace process, crude iron is converted into crude steel. By blowing oxygen onto liquid crude iron, troublesome impurities such as carbon, silicon, sulphur and phosphorus are removed. Since the oxidation processes cause an intense development of heat, scrap is often added in amounts of up to 25% with respect to the crude iron as a coolant. Furthermore, lime is added for forming slag and an alloying agent. A converter gas that has a high content of CO and also contains nitrogen, hydrogen and $CO_2$ is drawn off from the steel converter. A typical converter gas composition has 50 to 70% by volume CO, about 10 to 20% by volume $N_2$, about 15% by volume $CO_2$ and about 2% by volume $H_2$. The converter gas is either burned off or, in the case of modern steel mills, captured and passed on to be used for providing energy.

In the coke-oven plant, coal is converted into coke by a coking process. A coke-oven gas thereby occurs, containing a high hydrogen content and considerable amounts of $CH_4$. Typically, coke-oven gas contains 55 to 70% by volume $H_2$, 20 to 30% by volume $CH_4$, about 5 to 10% by volume $N_2$ and about 5% by volume CO. In addition, the coke-oven gas has fractions of $CO_2$, $NH_3$ and $H_2S$. In practice, the coke-oven gas is used in various areas of the works for heating purposes and in the power-generating process for electricity generation. In addition, it is known to use coke-oven gas together with blast-furnace top gas or with converter gas for producing syngases. According to a method known from WO 2010/136313 A1, coke-oven gas is separated into a hydrogen-rich gas stream and a residual gas stream containing $CH_4$ and CO, the residual gas stream being fed to the blast-furnace process and the hydrogen-rich gas stream being mixed with blast-furnace top gas and processed further into a syngas. It is known from EP 0 200 880 A2 to mix converter gas and coke-oven gas and use them as a syngas for methanol synthesis.

In an integrated metallurgical plant that is operated in combination with a coking plant, approximately 40 to 50% of the raw gases that occur as blast-furnace top gas, converter gas and coke-oven gas are used for chemical engineering processes. Approximately 50 to 60% of the gases produced can be used for electricity generation or used as raw gases for producing syngas. By using the gases for producing syngas, the cost-effectiveness of a metallurgical plant can be improved. At the same time, the $CO_2$ balance of the metallurgical plant also improves, since carbon is bound in chemical products and is not emitted in the form of $CO_2$. However, it must be taken into consideration here that the amount of raw gas that can be used for producing syngas is subject to considerable fluctuations over time.

This is so because, as long as the raw gases are used for producing syngas, the production of electricity by a power-generating plant operated in combination with the metallurgical plant must be cut back and electricity obtained from external sources to cover the electricity demand of the metallurgical plant. If electricity is available at low cost and in sufficient amounts, for example from renewable energy sources, a great amount of raw gas can be used for producing syngas. On the other hand, when there is a high price for the externally obtained electricity, it is necessary from economic considerations to use the usable amount of raw gas that occurs in the metallurgical plant at least predominantly for electricity generation and to cut back the production of syngas.

SUMMARY

One object of the invention includes providing a method for producing syngas in combined operation with a metallurgical plant with which it is possible to use the raw gases that occur in varying amounts and varying composition in a metallurgical plant as completely as possible in cost-effective processes.

DETAILED DESCRIPTION

Figure 1:
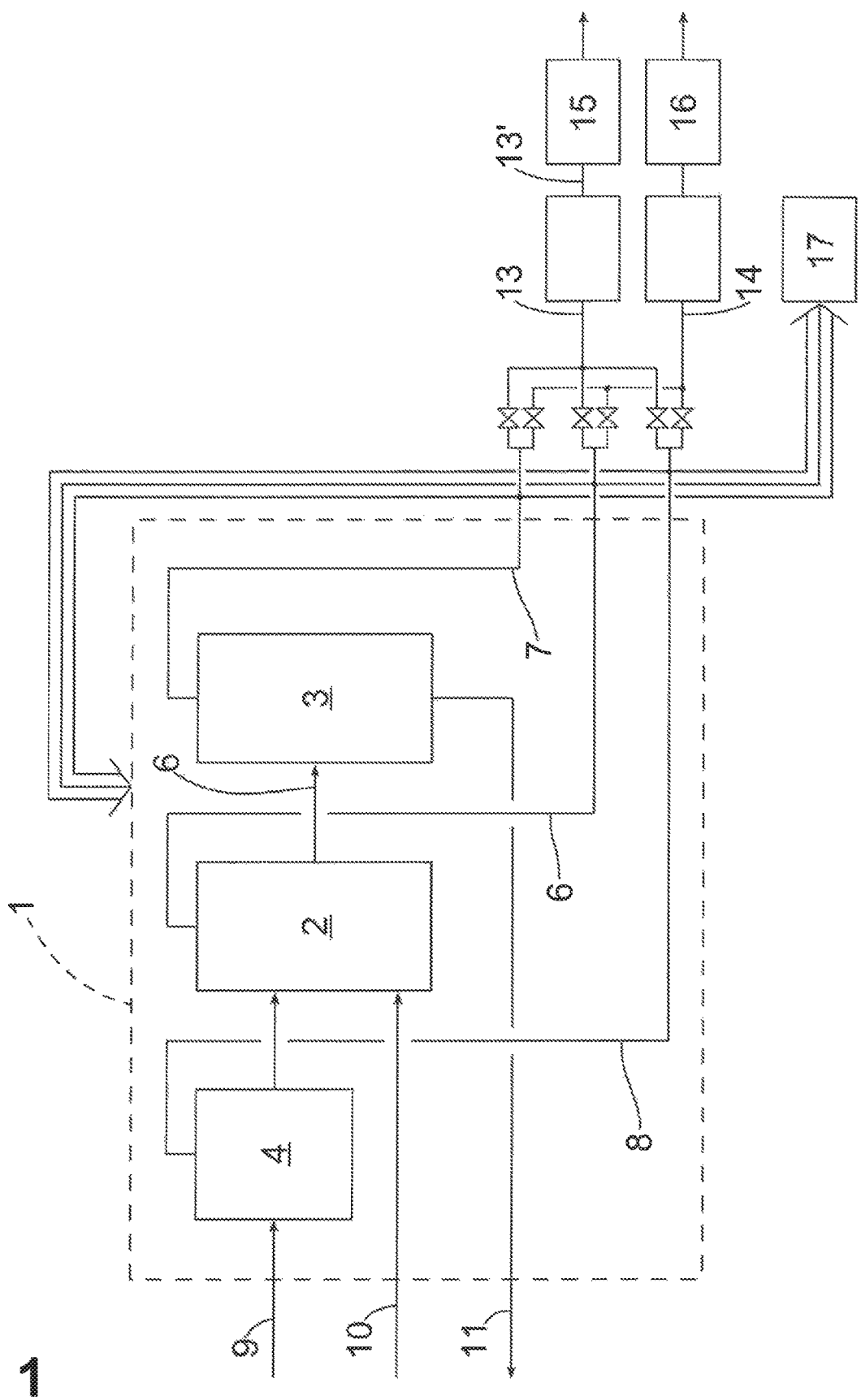
FIG. 1 shows a simplified block diagram of a plant complex for producing syngas in combination with at least one blast furnace for producing crude iron, a converter steel mill and a coke-oven plant.

According to the invention, part of the blast-furnace top gas that is produced in the production of crude iron and/or part of the converter gas that occurs in the converter steel mill and/or part of the coke-oven gas that is produced in the coke-oven plant are mixed. By choosing the gas streams that are brought together to form a mixed gas and/or by changing the mixing ratios of the gas streams that are brought together, two or more streams of useful gas are thereby produced, differing with regard to their composition and respectively prepared to form streams of syngas.

The preparation of the streams of useful gas comprises in particular a gas-cleaning operation and a gas-conditioning operation. A steam-reforming operation with water vapour, a partial oxidation with air or oxygen and a water-gas-shift reaction for the conversion of a CO fraction may be used for example for the gas conditioning. The conditioning steps may be used individually or else in combination.

The streams of syngas produced by the method according to the invention are gas mixtures that are used for synthesis. The term "syngas" covers for example mixtures of $N_2$ and $H_2$ for ammonia synthesis and in particular gas mixtures that mainly contain CO and $H_2$ or $CO_2$ and $H_2$ or CO, $CO_2$ and $H_2$. From the syngases, chemical products that respectively contain the components of the reactant can be produced in a chemical plant. Chemical products may be for example ammonia or methanol or else other hydrocarbon compounds.

For producing ammonia, a syngas that contains nitrogen and hydrogen in the correct ratio must be provided. The nitrogen can be obtained from blast-furnace top gas. Blast-furnace top gas or converter gas may be used in particular as the hydrogen source, hydrogen being produced by conversion of the CO fraction by a water-gas-shift reaction (CO+ $H_2O \rightleftharpoons CO_2 + H_2$). A mixture of coke-oven gas and blast-furnace top gas or a mixed gas comprising coke-oven gas, converter gas and blast-furnace top gas may also be used for producing a syngas for ammonia synthesis. For producing hydrocarbon compounds, for example methanol, it is necessary to provide a syngas consisting substantially of CO and/or $CO_2$ and $H_2$ that contains the components carbon monoxide and/or carbon dioxide and hydrogen in the correct ratio. The ratio is often described by the module $(H_2-CO_2)/(CO+CO_2)$. The hydrogen may be produced for example by conversion of the CO fraction in the blast-furnace top gas by a water-gas-shift reaction. Converter gas may be used for providing CO. Blast-furnace top gas and/or converter gas may serve as a source of $CO_2$. A mixed gas comprising coke-oven gas and converter gas or a mixed gas comprising coke-oven gas, converter gas and blast-furnace top gas is also suitable for producing hydrocarbon compounds.

Within the scope of the invention, a biotechnological plant may also be used instead of a chemical plant for producing chemical products from syngas. The plant concerned is a plant for the fermentation of syngas. Syngas should be understood in this case as including mixtures of CO and $H_2$ with which alcohols, acetone or organic acids can be produced. However, when a biochemical process is used, the hydrogen originates substantially from the water that is used as a medium in the fermentation. Converter gas is preferably used as a source for CO. The use of blast-furnace top gas or a mixed gas comprising converter gas and blast-furnace top gas is likewise possible. By contrast, the use of coke-oven gas is unfavourable for a biotechnological process. Consequently, products that contain carbon from the CO fraction of the raw gases that occur in a metallurgical plant and hydrogen from the water used in a fermentation process can be produced by means of a biotechnological process.

With the method according to the invention, raw gases that occur in a metallurgical plant in the production of crude iron, in the production of crude steel and in the production of coke can be used to produce at the same time streams of syngas, which are used in a chemical plant and in a biotechnological plant operated in parallel therewith for producing chemical products. The chemical plant and the biotechnological plant are arranged in parallel and can be operated at the same time or else in alternation. This makes it possible for the metallurgical plant to be operated in a cost-effective way, in particular even when the amounts of gas that can be used for producing syngas are subject to daily fluctuations.

An advantageous refinement of the method according to the invention provides that a first stream of useful gas, containing $H_2$, is formed and by gas conditioning is turned into a first syngas, which contains for example CO and $H_2$ or $N_2$ and $H_2$ as the main constituents, and that a second stream of useful gas, which is substantially free from $H_2$ and contains CO as the main constituent, is produced. The second stream of useful gas may consist in particular of converter gas or blast-furnace top gas or a mixed gas formed from converter gas and blast-furnace top gas.

A further variant of an embodiment of the invention provides that a first stream of useful gas is formed by mixing at least two gas streams that occur as blast-furnace top gas, converter gas or coke-oven gas, and that a second stream of useful gas consists only of blast-furnace top gas, converter gas or coke-oven gas.

The coke-oven gas and/or the blast-furnace top gas is expediently already cleaned before being used as useful gas, the cleaning having the effect of removing inter alia carbon black, high-boiling hydrocarbons, aromatic hydrocarbons (BTX), sulphur and sulphur compounds. In this case, the streams of useful gas are expediently cleaned before a gas-conditioning operation.

A further refinement of the invention provides that the hydrogen content of at least one stream of useful gas is set by separating out hydrogen, for example by means of a pressure swing adsorption plant, or by enriching with hydrogen. The hydrogen necessary for enriching may be produced in the metallurgical plant, for example by electrolysis of water. Furthermore, the hydrogen content of at least one stream of useful gas may be set by converting CO in a water-gas-shift reaction or by reforming $CH_4$.

The invention is explained below with respect to FIG. 1, which represents an exemplary embodiment.

The plant complex represented in FIG. 1 comprises a metallurgical plant 1, which comprises at least one blast furnace 2 for producing crude iron, a converter steel mill 3 and a coke-oven plant 4.

Crude iron is obtained in the blast furnace 2 substantially from iron ore and reducing agents, in particular coke and coal, oil, gas, biomasses and recycled plastics or other compounds containing carbon and/or hydrogen. A reduction reaction causes the production of a blast-furnace top gas 6, which contains as the main constituent nitrogen, CO, $CO_2$ and a small proportion of $H_2$. In the converter steel mill 3, which is arranged downstream of the blast-furnace process, crude iron is converted into steel. By blowing oxygen onto the liquid crude iron, troublesome impurities, in particular carbon, silicon and phosphorus, are removed. At the top of the converter, a converter gas 7 that has a high proportion of CO is drawn off. The metallurgical plant 1 also comprises a coke-oven plant 4. In the coking of coal into coke, coke-oven gas 8 occurs, containing a high proportion of hydrogen and $CH_4$.

According to an overall balance represented in FIG. 1, carbon 9 is fed to the plant complex as a reducing agent in the form of coal and coke and also iron ore 10. Occurring as products are crude steel 11 and raw gases 6, 7 and 8, which differ in amount, composition and purity and are used again at various points in the plant complex. In an overall consideration, 40 to 50%, usually approximately 45%, of the raw gases 6, 7 and 8 are returned into the metallurgical plant 1 again for producing pig iron or producing crude steel. Between 50 and 60%, usually approximately 55%, of the raw gases 6, 7 and 8 can be used for producing syngas.

According to the plant diagram represented in FIG. 1, part of the blast-furnace top gas 6 that is produced in the production of crude iron and/or part of the converter gas 7 that occurs in the converter steel mill 3 and/or part of the coke-oven gas 8 that is produced in the coke-oven plant 4 are mixed, choosing the gas streams that are brought together to form a mixed gas and/or changing the mixing ratios of the gas streams that are brought together having the effect that at least two streams of useful gas 13, 14 are produced, differing with regard to their composition and respectively prepared into streams of syngas.

In the exemplary embodiment, a first stream of useful gas 13, containing $H_2$, is formed and by gas conditioning is turned into a first syngas 13', which contains for example CO and $H_2$ or $N_2$ and $H_2$ as the main constituents. In a chemical plant 15, the syngas 13' is used for the synthesis of chemical products, for example ammonia, methanol or other hydrocarbon compounds. Furthermore, a second stream of useful gas 14, which is substantially free from $H_2$ and contains CO as the main constituent, is produced. The second stream of useful gas 14 consists of converter gas 7 or blast-furnace top gas 6 or a mixed gas formed from converter gas 7 and blast-furnace top gas 6. In a biotechnological plant 16, products that contain carbon from the CO fraction of the gases mentioned and hydrogen are produced. The hydrogen in this case originates substantially from the water that is used as a medium in the fermentation. The chemical plant 15 and the biotechnological plant 16 may be operated in parallel or else alternately. In the exemplary embodiment, they are arranged in parallel with a power-generating plant 17, which is designed as a gas-turbine power-generating plant or gas-turbine and steam-turbine power-generating plant and is operated with coke-oven gas 8, blast-furnace top gas 6 or converter gas 7 or a mixed gas composed of these gas components. Externally obtained electricity and power-generating plant electricity, which is produced by the power-generating plant 17 of the plant complex, are used to cover the electricity demand of the plant complex. To achieve operation of the plant complex that is as cost-effective as possible, at times of low electricity prices electricity is bought in and the operation of the power-generating plant 17 is cut back. Correspondingly, a great stream of raw gas can be used for producing syngas. If external electricity, for example from renewable energy sources, is not available to a sufficient extent and at acceptable prices, the production of syngas is reduced and the raw gas 6, 7, 8 is used more in the power-generating plant 17 for electricity generation.

The invention claimed is:

1. A method for producing syngas in combined operation with a metallurgical plant which comprises at least one blast furnace for producing crude iron, a converter steel mill, and a coke-oven plant, the method comprising:
    forming a mixed stream of gas by mixing a part of at least two items selected from the group consisting of: a blast-furnace top gas produced in the production of crude iron, a converter gas that occurs in the converter steel mill, and a coke-oven gas produced in the coke-oven plant;
    forming a second stream of gas, wherein the second stream of gas comprises converter gas that occurs in the converter steel mill, blast-furnace top gas produced in the production of crude iron, or a mixture of blast-furnace top gas produced in the production of crude iron and converter gas that occurs in the converter steel mill;
    producing a first stream of useful gas from the mixed stream of gas by selectively choosing the gas streams that are brought together to form the mixed stream of gas, or by changing the mixing ratios of the gas streams that are brought together to form the mixed stream of gas, wherein the first stream of useful gas contains $H_2$;
    producing a second stream of useful gas from the second stream of gas by selectively choosing the gas stream that forms the second stream of gas, wherein the second stream of useful gas contains CO as the main constituent and about 2% $H_2$ by volume;
    producing from the first stream of useful gas, by gas conditioning, a first syngas containing (1) CO and $H_2$; or (2) $N_2$ and $H_2$ as the main constituents;
    producing a first chemical product from the first syngas, the first stream of useful gas, the second stream of useful gas, or a combination of the first stream of useful gas and the second stream of useful gas; and
    producing a second chemical product from the first syngas, the first stream of useful gas, the second stream of useful gas, or a combination of the first stream of useful gas and the second stream of useful gas;
    wherein:
        the first and second streams of useful gas differ with regards to their respective compositions; and
        the first chemical product is different from the second chemical product.

2. The method according to claim 1, wherein preparation of the streams of useful gas further comprises a gas-cleaning operation.

3. The method according to claim 2, wherein at least one of a steam-reforming operation with water vapour, a partial oxidation with air or oxygen, and a water-gas-shift reaction is used for the gas conditioning.

4. The method according to claim 1, wherein the coke-oven gas and the blast-furnace top gas is cleaned before being used as useful gas, the cleaning having the effect of removing carbon black, high-boiling hydrocarbons, aromatic hydrocarbons, sulfur and sulfur compounds.

5. The method according to claim 1, wherein the streams of useful gas are cleaned before the gas conditioning operation, the cleaning having the effect of removing carbon black, high-boiling hydrocarbons, aromatic hydrocarbons, sulfur and sulfur compounds.

6. The method according to claim 1, wherein the hydrogen content of at least one stream of useful gas is set by separating out hydrogen by means of a pressure swing adsorption plant or by enriching with hydrogen.

7. The method according to claim 1, wherein at least one of the streams of useful gas is enriched with hydrogen that is produced in the metallurgical plant by electrolysis of water.

8. The method according to claim 7, wherein the hydrogen content of at least one stream of useful gas is set by reforming $CH_4$.

9. The method according to claim 1, wherein the hydrogen content of at least one stream of useful gas is set by converting CO in a water-gas-shift reaction.

10. The method according to claim 1, wherein the first mixed stream of gas comprises blast-furnace top gas and converter gas.

11. The method according to claim 10, wherein the second stream of gas comprises coke-oven gas.

12. A method for producing syngas in combined operation with a metallurgical plant which comprises at least one blast furnace for producing crude iron, a converter steel mill, and a coke-oven plant, the method comprising:
- forming a first stream of useful gas comprising at least one of: a blast-furnace top gas produced in the production of crude iron, a converter gas that occurs in the converter steel mill, and a coke-oven gas produced in the coke-oven plant; wherein the first stream of useful gas contains $H_2$;
- forming a second stream of useful gas comprising a converter gas that occurs in the converter steel mill, or a mixture of blast-furnace top gas produced in the production of crude iron and converter gas that occurs in the converter steel mill; wherein the second stream of useful gas contains CO as the main constituent and about 2% $H_2$ by volume;
- producing from the first stream of useful gas, by gas conditioning, a first syngas containing (1) CO and $H_2$; or (2) $N_2$ and $H_2$ as the main constituents;
- producing a first chemical product from the first syngas; and
- producing a second chemical product from the second stream of useful gas; wherein:
  - the first and second streams of useful gas differ with regards to their respective compositions; and
  - the chemical product from the first syngas is different from the chemical product from the second stream of useful gas.

* * * * *